(12) United States Patent
Akulov

(10) Patent No.: US 10,713,293 B2
(45) Date of Patent: Jul. 14, 2020

(54) METHOD AND SYSTEM OF COMPUTER-PROCESSING ONE OR MORE QUOTATIONS IN DIGITAL TEXTS TO DETERMINE AUTHOR ASSOCIATED THEREWITH

(71) Applicant: YANDEX EUROPE AG, Lucerne (CH)

(72) Inventor: Yaroslav Victorovich Akulov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 127 days.

(21) Appl. No.: 16/200,165

(22) Filed: Nov. 26, 2018

(65) Prior Publication Data

US 2019/0354631 A1 Nov. 21, 2019

(30) Foreign Application Priority Data

May 18, 2018 (RU) .................................. 2018118355

(51) Int. Cl.
*G06F 16/38* (2019.01)
*G06F 16/35* (2019.01)
(Continued)

(52) U.S. Cl.
CPC .............. *G06F 16/38* (2019.01); *G06F 16/35* (2019.01); *G06F 16/9535* (2019.01); *G06F 40/205* (2020.01)

(58) Field of Classification Search
CPC ...... G06F 16/38; G06F 16/35; G06F 16/9535; G06F 40/205
(Continued)

(56) References Cited

U.S. PATENT DOCUMENTS 8,713,031 B1 4/2014 Lee
8,805,781 B2 8/2014 Armstrong
(Continued)

FOREIGN PATENT DOCUMENTS

RU 2014139482 A 4/2016

OTHER PUBLICATIONS

Pareti, Silvia, et al., "Automatically Detecting and Attributing Indirect Quotations", Proc. of the 2013 Conf. on Empirical Methods in Natural Language Processing, Seattle, WA, Oct. 18-21, 2013, pp. 989-999.*

(Continued)

*Primary Examiner* — Robert Stevens
(74) *Attorney, Agent, or Firm* — BCF LLP

(57) ABSTRACT

A method and system for computer-processing quotations in digital text to determine an author associated therewith is disclosed. The method comprises receiving a plurality of digital texts. The plurality of digital texts are parsed to extract one or more quotations. At least one candidate authors are identified for each of the digital text. A quotation similarity value for a given quotation with respect to each of the remaining one or more quotations is assigned. A quotation cluster is generated, which comprises one or more similar quotations and a set of candidate authors. The set of candidate authors is analyzed to identify a given candidate author meeting a condition. The candidate author meeting the condition is stored as the author of the one or more similar quotations.

20 Claims, 9 Drawing Sheets

(51) Int. Cl.
  *G06F 16/9535* (2019.01)
  *G06F 40/205* (2020.01)
(58) Field of Classification Search
  USPC .......................................................... 707/737
  See application file for complete search history.

(56) References Cited

U.S. PATENT DOCUMENTS

| | | | |
|---|---|---|---|
| 9,223,881 B1 | 12/2015 | Weger | |
| 9,323,721 B1* | 4/2016 | Banerjee | ................ G06F 16/35 |
| 10,242,074 B2* | 3/2019 | Kazi | ..................... G06F 16/248 |
| 2006/0218492 A1 | 9/2006 | Andrade | |
| 2010/0287188 A1 | 11/2010 | Kakar | |
| 2015/0066968 A1* | 3/2015 | Bastide | ............... G06F 16/3344 |
| | | | 707/758 |
| 2016/0188603 A1 | 6/2016 | Weger | |
| 2017/0220579 A1* | 8/2017 | Kazi | ..................... G06F 40/284 |
| 2017/0220677 A1 | 8/2017 | Kazi et al. | |
| 2017/0235848 A1* | 8/2017 | Van Dusen | ........... G06F 16/904 |
| | | | 705/12 |

OTHER PUBLICATIONS

Skabar, Andrew, et al., "Clustering Sentence-Level Text Using a Novel Fuzzy Relational Clustering Algorithm", IEEE Transactions on Knowledge and Data Engineering, vol. 25, No. 1, Jan. 2013, pp. 62-75.*

Devi, M. Uma, et al., "An Enhanced Fuzzy Clustering and Expectation Maximization Framework based Matched Semantically Similar Sentences", Procedia Computer Science, vol. 57, © 2015, pp. 1149-1159.*

Suen, Caroline, et al., "NIFTY: A System for Large Scale Information Flow Tracking and Clustering", WWW 2013, Rio de Janeiro, Brazil, May 13-17, 2013, pp. 1237-1247.*

Hjørland, Birger, "Citation analysis: A social and dynamic approach to knowledge organization", Information Processing and Management, vol. 49, Issue 6, Nov. 2013, pp. 1313-1325.*

Han, Hui, et al., "Name Disambiguation in Author Citations using a K-way Spectral Clustering Method", JCDL '05, Denver, CO, Jun. 7-11, 2005, pp. 334-343.*

* cited by examiner

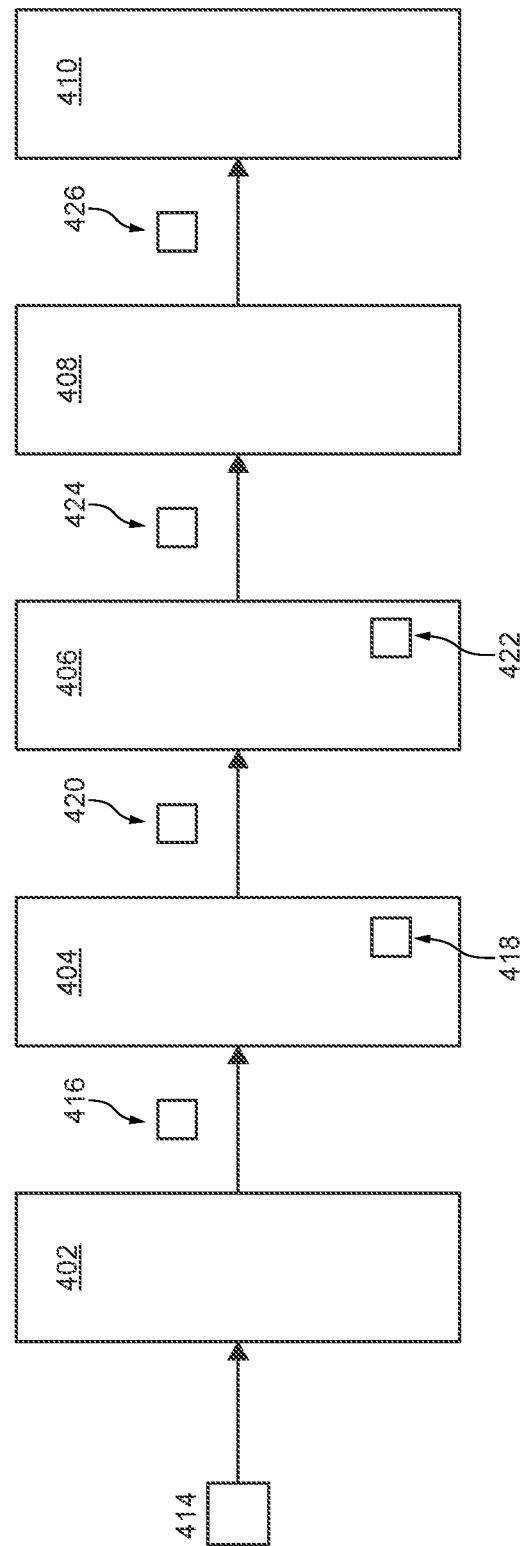

| # | Quotation | Candidate Author |
|---|---|---|
| 204 | *Lacrosse is a Canadian national sport* <u>502</u> | Prime Minister Trudeau — 508 |
| 206 | *Lacrosse is a Canadian national sport and so is Hockey* <u>504</u> | Trudeau — 510 |
| 208 | *If you read the National Sports of Canada Act, you will notice that Lacrosse is a Canadian national sport and so is Hockey* <u>505</u> | Justin Trudeau — 512 |
| | | Katie Telford — 513 |
| | *With that, we will now end the emergency press conference* <u>506</u> | Katie Telford — 514 |

FIG. 5

| | | Quotation similarity value |
|---|---|---|
| 502 | 504 | 1 |
| 502 | 505 | 1 |
| 502 | 506 | 0 |

METHOD AND SYSTEM OF COMPUTER-PROCESSING ONE OR MORE QUOTATIONS IN DIGITAL TEXTS TO DETERMINE AUTHOR ASSOCIATED THEREWITH

CROSS-REFERENCE

The present application claims priority to Russian Patent Application No. 2018118355, entitled "Method And System Of Computer-Processing One Or More Quotations In Digital Texts To Determine Author Associated Therewith," filed May 18, 2018, the entirety of which is incorporated herein by reference.

FIELD

The present technology generally relates to news aggregation services, and more particularly, to a system and method of computer-processing quotations in digital texts to determine an author associated therewith.

BACKGROUND

With the growth of users accessing the Internet, a vast number of Internet based services has surfaced. Such services include, for example, search engine service (such as Yandex™, Google™, and the like), social network service (such as Facebook™) multimedia service (such as Instagram™ and YouTube™), and news aggregator service (such as Yandex.News™). The latter service has been particularly useful in allowing users to easily view news articles on one platform.

Digital news aggregation is a technology area of growing interests. Indeed, news is a very important part of the daily life, whether for a stock broker or a lawyer. News aggregation service allows the user to be exposed to the most current news, without the need of frequently visiting many separate websites (such as those associated with individual news agencies or individual newspapers) to see if the content has been updated.

Generally speaking, news are made up of editorial content and various quotations of people (such as politicians, celebrities, individuals with specific knowledge relevant to the article, etc.). These quotations may be repeated by different news agencies, which may contain errors on the authorship or may have ambiguous references to the author of the quotation. As such, in some instances, the news aggregator service is provided with different news articles, in which the authorship of the same quotation is mismatching amongst the different news articles.

Needless to say, not only the user is provided with a frustrating experience of seeing different news articles having different authors associated with the same quotation, the user is required to do additional searches on the Internet to determine who is the correct author, which may require significant amount of computational power and resources.

Moreover, it is generally known that users of news aggregator services tend to focus more on the quotation than the content of the news article to grasp the essence of the reported event. As such, some news aggregator services provide a quotation separately from the content of the news article. In other words, it may be desirable for the news aggregator to show just the quotation and the author of the quotation rather the entire news piece. For example, a given news aggregator may provide a plurality of different quotations (with the associated authors) in a news-feed of important quotations.

A conventional approach at displaying one or more quotations in the news aggregator service requires one or more persons associated with the news aggregator service to previously select the quotation and manually determine its author. Needless to say, not only this approach takes both human and computational resources, it may also cause a delay for the news aggregator service to "publish" the news articles.

U.S. Pat. No. 8,805,781 B2 (published on Dec. 21, 2006) discloses a computerized system and method for analyzing quotations made in a quoting document of text originally found in a source document. The present invention analyzes the quoting document for quoted text, searches the source document for that text, and stores the existence of the quotation in association with the source document. When displaying the source document, a list of text items that were quoted by another document is presented sorted by frequency of quotation. Quoted text is also highlighted when the original text of the source document is displayed. Hyperlinking is allowed between items of quoted text by the user and a list of documents that have quoted that text. From this list the full text of a quoting document may be displayed. The frequency of quotations taken from a source document can also be used to rank documents in search results.

US 2017/220677 A1 (published on Aug. 3, 2017) discloses in one embodiment, a method includes accessing a plurality of communications, each communication being associated with a particular content item and including a text of the communication; extracting, for each of the communications, quotations from the text of the communication; determining, for each extracted quotation, partitions of the quotation; grouping the extracted quotations into clusters based on a respective degree of similarity among their respective partitions; calculating a cluster-score for each cluster based on a frequency of occurrence of partitions of quotations in the cluster in the communications; and generating a quotations-module comprising representative quotations, each representative quotation being a quotation from a cluster having a cluster-score greater than a threshold cluster-score.

U.S. Pat. No. 9,223,881 B1 (published on Dec. 29, 2015) discloses systems and methods for managing quotes. The system may facilitate a user search that relates one or more particular quotes, authors, categories of quotes, specific tag of a quote, and the like. A set of results may be provided based on a user search may be provided. A quote profile and an author profile may be generated providing information about a quote and an author respectively. A user profile page may display information including a user's favorite quotes.

SUMMARY

It is an object of the present technology to provide improved method and systems for computer-processing one or more quotations in digital texts to determine an author associated therewith.

Without wishing to be bound to any specific theory, embodiments of the present technology have been developed based on an assumption that by analyzing a set of news articles directed to a same topic, it is possible to identify quotations and their corresponding "correct" authors in a more accurate manner. It would thus then be possible to display the one or more quotations on the news aggregator service with the "correct" author with less computational burden.

According to a broad aspect of the present technology there is provided a computer implemented method for processing one or more quotations in digital texts to determine an author associated therewith. The method is executable by a server configured to execute a news aggregator service also coupled to a plurality of digital news services via a communication network. The method comprising: receiving a plurality of digital texts from a database; parsing each of the plurality of digital texts to extract one or more quotations therefrom, the parsing being executed by applying one or more parsing rules; identifying at least one associated candidate author for each of the one or more quotations, the identifying being executed by applying one or more identification rules; assigning, by a first classifier, a quotation similarity value for a given quotation with respect to each of a remaining one or more quotations, the quotation similarity value being representative of a likelihood of the given quotation originating from a same quotation with respect to each of the remaining one or more quotations; generating a quotation cluster, the quotation cluster comprising: one or more similar quotations, the one or more similar quotations comprising the given quotation and a subset of the remaining one or more quotations each having the similarity value above a threshold, and a set of candidate authors, the set of candidate authors comprising at least one candidate author associated with each of the one or more similar quotations; analyzing the set of candidate authors to identify a given candidate author meeting a condition; and storing the candidate author meeting the condition as the author of the one or more similar quotations.

In some embodiments, the digital texts correspond to news articles representative of a same topic, wherein the plurality of news articles are received from the plurality of digital news services.

In some embodiments, the one or more parsing rules comprise extracting one or more portion of digital texts interposed between a given set of quotation marks.

In some embodiments, the one or more identification rules comprise identifying at least one capitalized word within a predetermined distance from the given set of quotation marks.

In some embodiments, the given quotation is a first quotation; the threshold is a first threshold; and assigning the quotation similarity value to the first quotation in respect to a second quotation comprises: determining a shortest common consecutive string of words between the first quotation and the second quotation; and determining if a length of the shortest common consecutive string of words is above a second threshold.

In some embodiments, the quotation similarity value comprises a binary value.

In some embodiments, analyzing the set of candidate authors to identify the given candidate author meeting a condition comprises: determining a frequency of occurrence of the given candidate author within the set of candidate authors; and determining that the frequency of occurrence of the given candidate author is a highest frequency within the set of candidate authors.

In some embodiments, in response to a client device accessing the news aggregator service, the method further comprises transmitting to the client device a data packet, the data packet comprising: a best quotation corresponding to one of the one or more similar quotations; and the author of the best quotation.

In some embodiments, the best quotation corresponds to one of the one or more similar quotations having a longest string of consecutive words.

In some embodiments, the server is further coupled to an image database, the image database comprising a plurality of images associated with at least one of the one or more candidate authors; and the method further comprises: prior to transmitting the data packet, retrieving an image associated with the author; and wherein the data packet further comprises the image.

In another broad aspect of the present technology, there is provided a server for processing one or more quotations in digital texts to determine an author associated therewith. The server is coupled to a plurality of digital news services via a communication network. The server comprises a processor configured to: receive a plurality of digital texts from a database; parse each of the plurality of digital texts to extract one or more quotations therefrom, the parsing being executed by applying one or more parsing rules; identify at least one associated candidate author for each of the one or more quotations, the identifying being executed by applying one or more identification rules; assign, by a first classifier, a quotation similarity value for a given quotation with respect to each of a remaining one or more quotations, the quotation similarity value being representative of a likelihood of the given quotation originating from a same quotation with respect to each of the remaining one or more quotations; generate a quotation cluster, the quotation cluster comprising: one or more similar quotations, the one or more similar quotations comprising the given quotation and a subset of the remaining one or more quotations each having the similarity value above a threshold, and a set of candidate authors, the set of candidate authors comprising at least one candidate author associated with each of the one or more similar quotations; analyze the set of candidate authors to identify a given candidate author meeting a condition; and store the candidate author meeting the condition as the author of the one or more similar quotations.

In some embodiments, the digital texts correspond to news articles representative of a same topic, wherein the plurality of news articles are received from the plurality of digital news services.

In some embodiments, the one or more parsing rules comprises extracting one or more portion of digital texts interposed between a given set of quotation marks.

In some embodiments, the one or more identification rules comprise identifying at least one capitalized word within a predetermined distance from the given set of quotation marks.

In some embodiments, the given quotation is a first quotation; the threshold is a first threshold; and to assign the quotation similarity value to the first quotation in respect to a second quotation, the processor is configured to: determine a shortest common consecutive string of words between the first quotation and the second quotation; and determine if a length of the shortest common consecutive string of words is above a second threshold.

In some embodiments, the quotation similarity value comprises a binary value.

In some embodiments, to analyze the set of candidate authors to identify the given candidate author meeting a condition, the processor is configured to: determine a frequency of occurrence of the given candidate author within the set of candidate authors; and determine that the frequency of occurrence of the given candidate author is a highest frequency within the set of candidate authors.

In some embodiments, the processor is further configured to: in response to a client device accessing the news aggregator service, transmit to the client device a data packet, the data packet comprising: a best quotation corresponding to one of the one or more similar quotations; and the author of the best quotation.

In some embodiments, the best quotation corresponds to one of the one or more similar quotations having a longest string of consecutive words.

In some embodiments, the server is further coupled to an image database, the image database comprising a plurality of images associated with at least one of the one or more candidate authors; and the processor is further configured to: prior to transmitting the data packet, retrieve an image associated with the author; and wherein the data packet further comprises the image In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where:

FIG. 4 depicts an example of a process of computer-processing one or more quotations in digital texts to determine an author associated therewith.

FIG. 5 depicts an index generated by a quotation parsing routine of FIG. 4.

DETAILED DESCRIPTION

Figure 1:
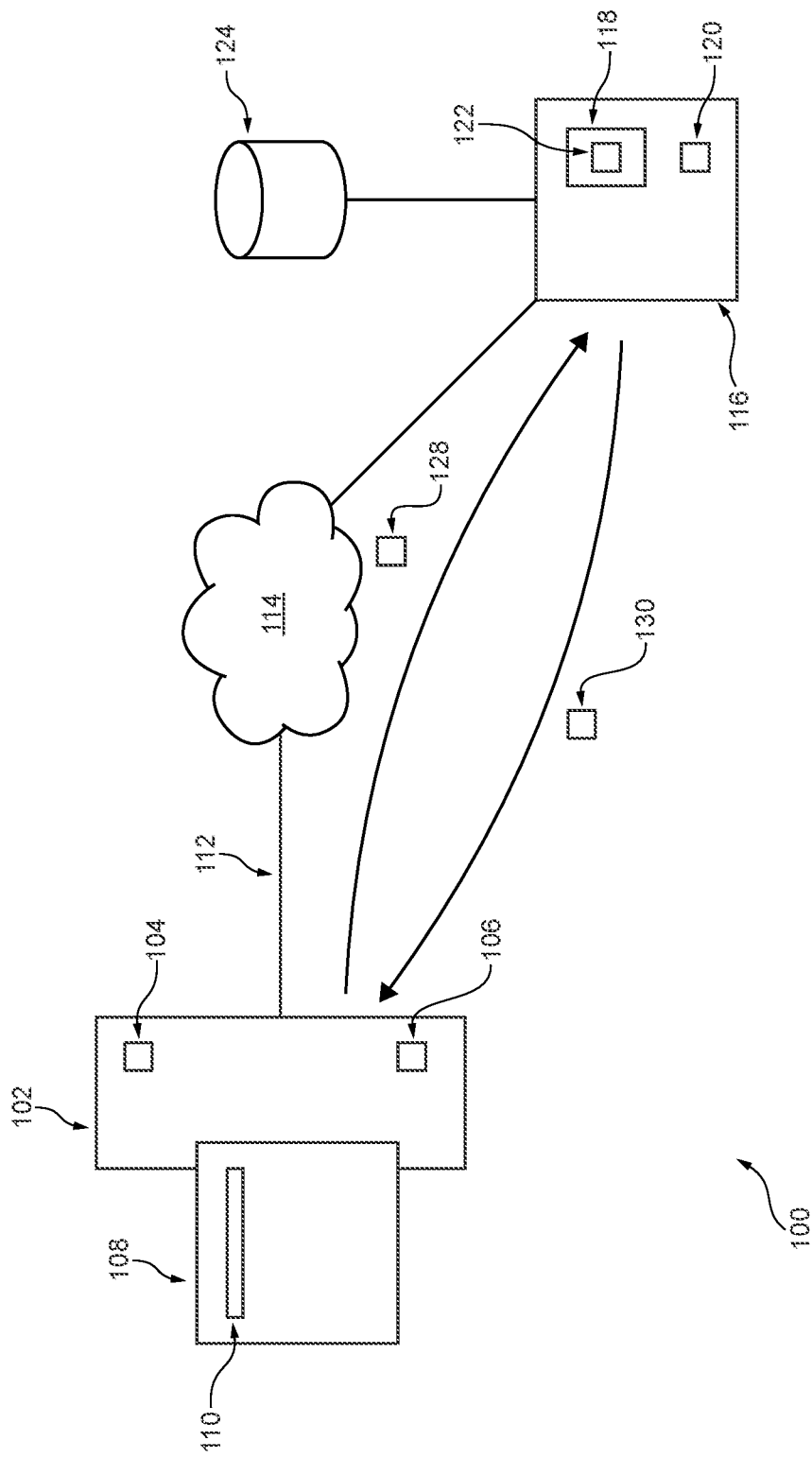
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art to execute a browser application 108. Generally speaking, the purpose of a browser application 108 is to enable the user (not depicted) to access one or more web resources. The manner in which the browser application 108 is implemented is known in the art and will not be described herein. Suffice to say that the browser application 108 may be one of Google™ Chrome™, Yandex-.Browser™, or other commercial or proprietary browsers.

Irrespective of how the browser application 108 is implemented, the browser application 108, typically, has a command interface 110. Generally speaking, the user (not depicted) can access a web resource via a communication network by two principle means. The given user can access a particular web resource directly, either by typing an address of the web resource (typically an URL or Universal Resource Locator, such as www.example.com) into the command interface 110 or by clicking a link in an e-mail or in another web resource (which action will in a sense "copy and paste" the URL associated with the link into the command interface 110).

Alternatively, the given user may conduct a search using a search engine service (not depicted) to locate a resource of interest based on the user's search intent. The latter is particularly suitable in those circumstances, where the given user knows a topic of interest, but does not know the URL of the web resource she is interested in. The search engine typically returns a Search Engine Result Page (SERP) containing links to one or more web resources that are responsive to the user query. Again, upon the user clicking one or more links provided within the SERP, the user can open the required web resource.

The electronic device 102 comprises a communication interface (not depicted) for two-way communication with a communication network 114 via a communication link 112. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 112 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 112 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 112 and the communication network 114 are provided for illustration purposes only. As such, those skilled in the art will easily appreciate other specific implementational details for the electronic device 102, the communication link 112, and the communication network 114. As such, by no means the examples provided hereinabove are meant to limit the scope of the present technology.

The system 100 further includes a server 116 coupled to the communication network 114. The server 116 can be implemented as a conventional computer server. In an example of an embodiment of the present technology, the server 116 can be implemented as a Dell™ PowerEdge™ Server running the Microsoft Windows Server™ operating system. Needless to say, the server 116 can be implemented in any other suitable hardware and/or software and/or firmware or a combination thereof. In the depicted non-limiting embodiment of the present technology, the server 116 is a single server. In alternative non-limiting embodiments of the present technology, the functionality of the server 116 may be distributed and may be implemented via multiple servers.

The implementation of the server 116 is well known. However, briefly speaking, the server 116 comprises a communication interface (not depicted) structured and configured to communicate with various entities (such as the electronic device 102 and other devices potentially coupled to the communication network 114) via the communication network 114. Similar to the electronic device 102, the server 116 comprises a server memory 118 which comprises one or more storage media and generally provides a place to store computer-executable program instructions executable by a server processor 120. By way of example, the server memory 118 may be implemented as a tangible computer-readable storage medium including Read-Only Memory (ROM) and/or Random-Access Memory (RAM). The server memory 118 may also include one or more fixed storage devices in the form of, by way of example, hard disk drives (HDDs), solid-state drives (SSDs), and flash-memory cards.

In some embodiments, the server 116 can be operated by the same entity that has provided the afore-described browser application 108. For example, if the browser application 108 is a Yandex.Browser™, the server 116 can be operated by Yandex LLC of Lev Tolstoy Street, No. 16, Moscow, 119021, Russia. In alternative embodiments, the server 116 can be operated by an entity different from the one who has provided the aforementioned browser application 108.

In accordance with the present technology, the server 116 is configured to execute a news aggregator application 122, such as Yandex.News™. The manner in which the news aggregator application 122 will be implemented is described in detail below. For now, suffice to say that the news aggregator application 122 is configured to provide a news aggregator service that is accessible by the electronic device 102 via the communication network 114 to provide news content from multiple sources (not depicted).

To that end, the server 116 is communicatively coupled to a news database 124 via a dedicated link (not numbered). In alternative implementations, the news database 124 may be communicatively coupled to the server 116 via the communication network 114 without departing from the teachings of the present technology. Although the news database 124 is illustrated schematically herein as a single entity, it is contemplated that the news database 124 may be configured in a distributed manner.

The news database 124 is populated with a plurality of digital documents (not depicted). The nature of each of the plurality of digital documents is not particularly limited. Broadly speaking, a given one of the one or more digital documents contains one or more sentences, images, videos, etc. The digital document can be, for example a news article (such as, for example a CNN™ article about current world politics).

News Database 124

Figure 2:
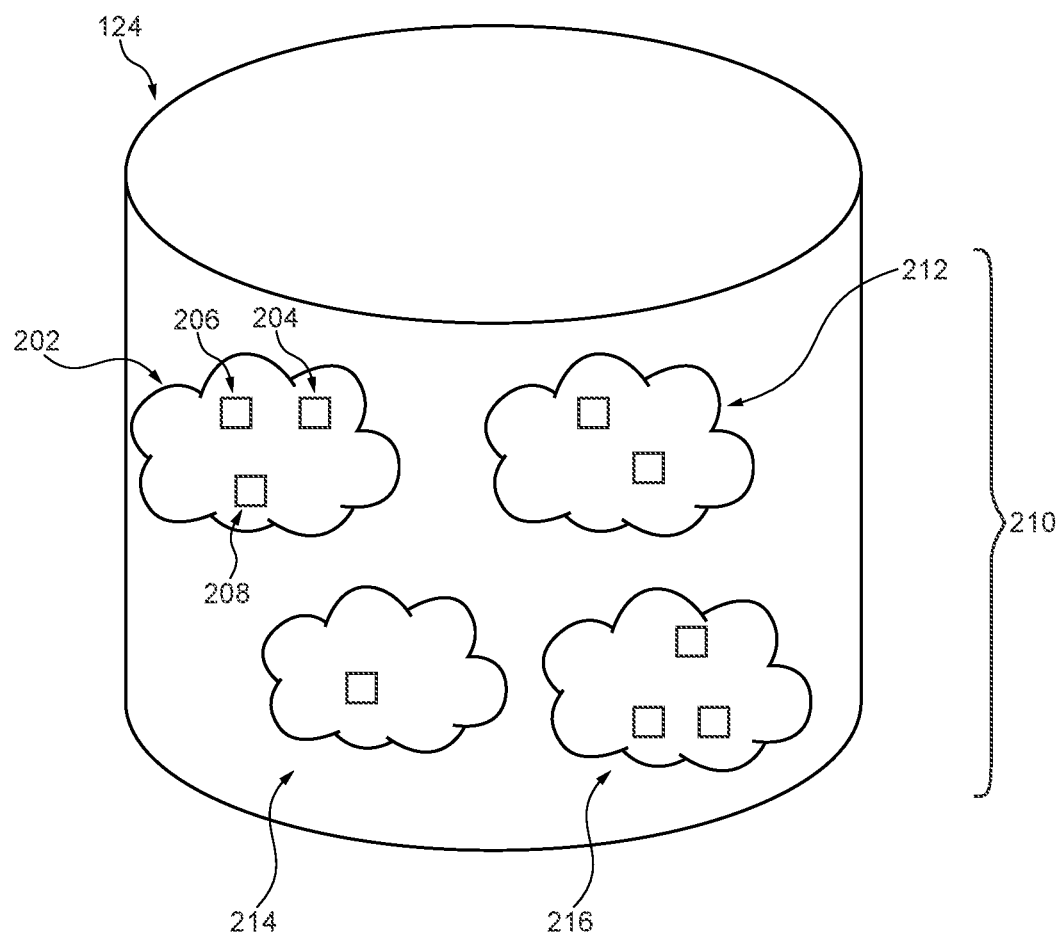
FIG. 2 depicts a schematic illustration of a news database of the system of FIG. 1.

With reference to FIG. 2, a non-limiting embodiment of the news database 124 populated with the plurality of digital documents is illustrated.

The manner in which the news database 124 is populated is not limited. Just as an example, the news database 124 may execute (or have access to) a crawling function configured to gather the plurality of digital documents from selected news sources, such as websites of newspapers, online magazines, other electronic news resources, etc. Alternatively, the news database 124 may receive the plurality of digital documents directly from various sources, without the use of a crawling function.

The news database 124 stores the plurality of digital documents clustered into one or more topics or events. As such, the news database 124 executes (or has access to) a topic clustering function (not illustrated). The manner in which the plurality of digital documents are clustered into one or more topics or events is not limited, and may for example, be done using conventional clustering techniques, such as topic modelling or key word-based approaches The plurality of digital documents is clustered into one or more topic clusters 210. For example, the news database 124 stores a first topic cluster 202, a second topic cluster 212, a third topic cluster 214 and a fourth topic cluster 216. The first topic cluster 202 includes a first digital document 204, a second digital document 206 and a third digital document 208. In the illustrated example, the first topic cluster 202 is made up of news articles discussing the confirmation by Canada's Prime Minister Trudeau that Lacrosse is also a Canadian national sport.

In some implementations of the present technology, the news database 124 further comprises an indication of a source (such as the URL) for each of the plurality of documents stored therein. For example, the first digital document 204 is associated with a first URL (not depicted) related to CNN™, the second digital document 206 is associated with a second URL (no depicted) related to Montreal Gazette™, and the third digital document 208 is associated with a third URL (not depicted) related to Yahoo!™.

Digital Document

Figure 3:
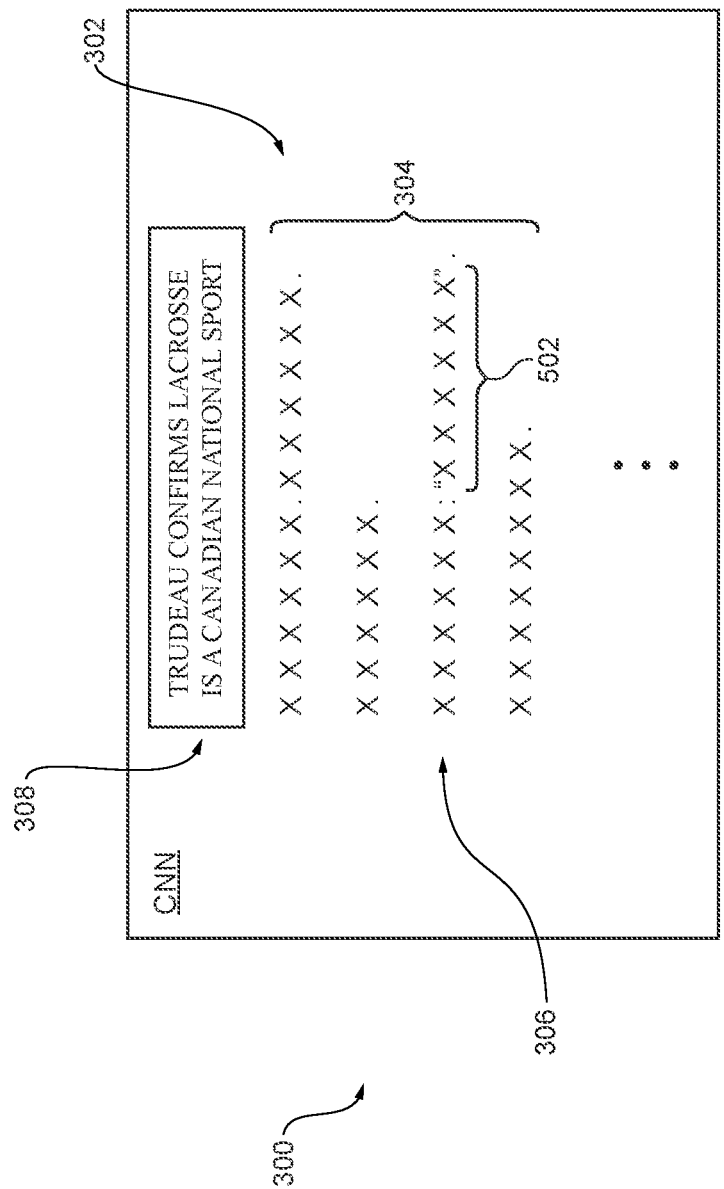
FIG. 3 depicts a screenshot of a digital document rendered on the electronic device of the system of FIG. 1.

Attention is briefly directed to FIG. 3, which illustrates a screenshot 300 of the first digital document 204, displaying a digital text 302. The digital text 302 can be, for example, a version of the first digital document 204, rendered on an output device of the electronic device 102, in response to the browser application 108 accessing the first URL (not shown) related to the first digital document 204. Although the output device is not depicted, it can be implemented as a screen, a monitor, a touch-screen or the like. In some embodiments, the news article is a natural language text written in a language.

The digital text 302 includes a title 308 and content, the content being made up of a plurality of sentences 304. The plurality of sentences 304 includes a number of individual sentences, such as a sentence 306. Although the plurality of sentences 304 are separated by a full stop (i.e. a period), a person skilled in the art would understand that this is not always the case, and other punctuation marks, such as a question mark, an exclamation point may separate the plurality of sentences 304. For the avoidance of any doubt, it should be mentioned that the digital text 302 (and more specifically each letter), is represented by an "X", however, in reality the individual sentences are made of words in a given language (such as English).

Although only a screenshot of the first digital document 204 is illustrated, it should be understood that the second digital document 206, and the third digital document 208 also comprise their respective digital texts.

News Aggregator Application

Using an example of the digital text 302, functions and operations of the various components of the news aggregator application 122 for associating an author to one or more quotations will now be described in more details. With reference to FIG. 4, there is provided a schematic illustration of the news aggregator application 122 being implemented in accordance with non-limiting embodiments of the present technology. The news aggregator application 122 executes (or otherwise has access to): a quotation parsing routine 402, a first classifying routine 404, a second classifying routine 406, a quotation selection routine 408 and an article selection routine 410.

In the context of the present specification, the term "routine" refers to a subset of the computer executable program instructions of the news aggregator application 122 that is executable by the server processor 120 to perform the functions explained below in association with the various routines (the quotation parsing routine 402, the first classifying routine 404, the second classifying routine 406, the quotation selection routine 408 and the article selection routine 410). For the avoidance of any doubt, it should be expressly understood that the quotation parsing routine 402, the first classifying routine 404, the second classifying routine 406, the quotation selection routine 408 and the article selection routine 410 are illustrated schematically herein as separate entities for ease of explanation of the processes executed by the news aggregator application 122. It is contemplated that some or all of the quotation parsing routine 402, the first classifying routine 404, the second classifying routine 406, the quotation selection routine 408 and the article selection routine 410 may be implemented as one or more combined routines.

For ease of understanding the present technology, functionality of each one of the quotation parsing routine 402, the first classifying routine 404, the second classifying routine 406, the quotation selection routine 408 and the article selection routine 410, as well as data and/or information processed or stored therein are described below.

Quotation Parsing Routine

The quotation parsing routine 402 is configured to receive a data packet 414 from the news database 124. The data packet 414 comprises digital documents previously determined to have the same topic. For example, the data packet 414 comprises the first digital document 204, the second digital document 206 and the third digital document 208 which have been previously clustered into the first topic cluster 202.

The quotation parsing routine 402 is configured to execute the following functions. First, the quotation parsing routine 402 is configured to analyze the content of each of the first digital document 204, the second digital document 206 and the third digital document 208 to identify the presence of any quotations and extract them. In the context of the present specification, the term "quotation" refers to a group of words taken from a text or speech and repeated by someone other than the original author or speaker.

The quotation parsing routine 402 is further configured to identify at least one associated candidate author for each of the extracted quotations. In the context of the present specification, the term "candidate author" refers to a possible author, or originator of the identified quotation.

Taking the first digital document 204 as an example, the manner in which the quotation parsing routine 402 is implemented will be now described. Needless to say, the manner in which the parsing routine 402 is implemented against the second digital document 206 and the third digital document 208 will be similar.

The quotation parsing routine 402 executes the parsing by applying one or more parsing rules. The one or more parsing rules can be based on specific one or more heuristic rules. The one or more heuristic rules can be grammatical rules. As an example, a parsing rule can be that a portion of text interposed between a set of quotation marks is a quotation. In some embodiments, the one or more parsing rules are language-specific rules (i.e. rules specifically selected for the language of the first digital document 204, the second digital document 206 and the third digital document 208).

Taking the digital text 302 as an example, the quotation parsing routine 402 has identified a set of quotation marks within the sentence 306, and extracted the portion of the text included therebetween as a first quotation 502.

Needless to say, it is contemplated that the quotation parsing routine 402 may identify more than one quotation within the digital text 302.

Having extracted the first quotation 502, the quotation parsing routine 402 now identifies the candidate author by applying one or more identification rules. The one or more identification rules can be based on specific one or more heuristic rules. The one or more heuristic rules can be grammatical rules. As an example, an identification rule can be that one or more consecutive capitalized words within a predetermined distance (which may be empirically determined) of the quotation is a candidate author. In some embodiments, the one or more identification rules are language-specific rules (i.e. rules specifically selected for the language of the first digital document 204, the second digital document 206 and the third digital document 208).

Following with the digital text 302 as an example, the quotation parsing routine 402 has analyzed and identified a set of consecutive capitalized words within the sentence 306, and has stored the set of consecutive capitalized words as a first candidate author 508 of the first quotation 502 (shown in FIG. 5).

Needless to say, it is contemplated that the quotation parsing routine 402 may identify more than one candidate author for a given quotation (or even identify no candidate author), depending on the manner in which the digital text 302 may have been drafted (described below).

Based on the extracted quotations and the identified one or more candidate authors, the quotation parsing routine 402 is configured to generate an index 500 (discussed below).

With brief reference to FIG. 5, there is provided a non limiting example of the index 500 populated with a plurality of quotations and candidate authors.

In the illustrated example, the quotation parsing routine 402 has identified the first quotation 502 within the first digital document 204, which is associated with the first candidate author 508.

The quotation parsing routine 402 has further identified a second quotation 504 within the second digital document 206, which is associated with a second candidate author 510.

The quotation parsing routine 402 has identified two quotations within the third digital document, namely a third quotation 505 and a fourth quotation 506.

With regards to the third quotation 505, the quotation parsing routine 402 has identified two candidate authors, namely a third candidate author 512, and a fourth candidate author 513. As briefly described above, this may occur because the quotation parsing routine 402 has determined that both the third candidate author 512 and the fourth candidate author 513 meet the one or more identification rules. For example, the third digital document 208 may have been drafted where the fourth candidate author 513 has quoted the third candidate author 512 and the third quotation 505 (e.g. "Katie Telford has confirmed that Justin Trudeau stated that: "[ . . . ]"), and both the fourth candidate author 513 and the third candidate author 512 meet the one or more identification rules.

Finally, the fourth quotation 506 is associated with a fifth candidate author 514.

In some implementations, the quotation parsing routine 402 has access to a dictionary application (not depicted), and is configured to determine whether the one or more capitalized words in a given candidate author is a proper noun or a common noun. If it is determined that the candidate author consists of both a proper noun and a common noun, only the proper noun is considered to be the candidate author. As such, taking the first candidate author 508 as an example, the quotation parsing routine 402 would remove the terms "Prime Minister", resulting in the first candidate author 508 to correspond to "Trudeau".

In another implementation, the quotation parsing routine 402 is further configured to standardize each of the parsed quotations (i.e. the first quotation 502, the second quotation 504, the third quotation 505, and the fourth quotation 506). For example, the quotation parsing routine 402 is configured to remove any punctuation marks, such as ellipsis (e.g. [ . . . ]), changing the words of the quotations into lowercase, and the like.

First Classifying Routine

Once the quotations and their respective candidate authors have been identified, the quotation parsing routine 402 is configured to transmit a data packet 416 to the first classifying routine 404. The data packet 416 comprises the index 500.

The first classifying routine 404 executes a first classifier 418 which is configured to select one of the quotation included in the index 500 (such as the first quotation 502) and assign a quotation similarity value to each of the remaining quotations. The quotation similarity value is representative of a likelihood of two quotations originating from the same original quotation.

The manner in which the quotation similarity value is implemented is not limited, and may for example be implemented as a binary value, where a first binary value (such as 1) is indicative that the first quotation 502 likely originates from the same original quotation as the second quotation 504 (or third quotation 505, fourth quotation 506), and a second binary value (such as 0) is indicative of that the first quotation 502 does not likely originate from the same original quotation as the second quotation 504 (or third quotation 505, fourth quotation 506) (or vice-versa).

As such, taking the first quotation 502 as an example, the manner in which the first classifier 418 calculates the quotation similarity value against each of the second quotation 504, the third quotation 505 and the fourth quotation 506 will now be described.

Firstly, the first classifier 418 is configured to determine a shortest common consecutive string of words between the first quotation 502 and the second quotation 504. More precisely, the first quotation 502 is compared to the second quotation 504 to determine a length of consecutive words of the first quotation 502 also found within the second quotation 504. If it is determined that the length of the shortest common consecutive string of words is above a first threshold, the first classifier 418 is configured to assign the first binary value (e.g. 1) to the second quotation 504. The manner in which the first threshold is determined is not limited, and may for example be empirically determined.

This is based on the developers' awareness that news articles may cut out some portions of the original quotation when the original quotation is long, or may only select a portion of the original quotation to be used within the news article. As such, developers' assumed that by determining if the length of the shortest common consecutive string between two quotations (that are not verbatim to one another) is above the first threshold, it is indicative that the quotations likely originate from the same quotation.

As such, the first classifier 418 is configured to determine a shortest common consecutive string of words between the first quotation 502 and the third quotation 505. If it is determined that the length of the shortest common consecutive string of words is above the first threshold, the first classifier 418 is configured to assign the first binary value (e.g. 1) to the third quotation 505.

Finally, the first classifier 418 is configured to determine a shortest common consecutive string of words between the first quotation 502 and the fourth quotation 506. If it is determined that the length of the shortest common consecutive string of words is below the first threshold, the first classifier 418 is configured to assign the second binary value (e.g. 0) to the fourth quotation 506.

Although the quotation similarity value has been explained as being implemented using binary values, it is not limited as such. The quotation similarity value may be implemented differently, such as a percentage value, or any other scale.

Figure 6:
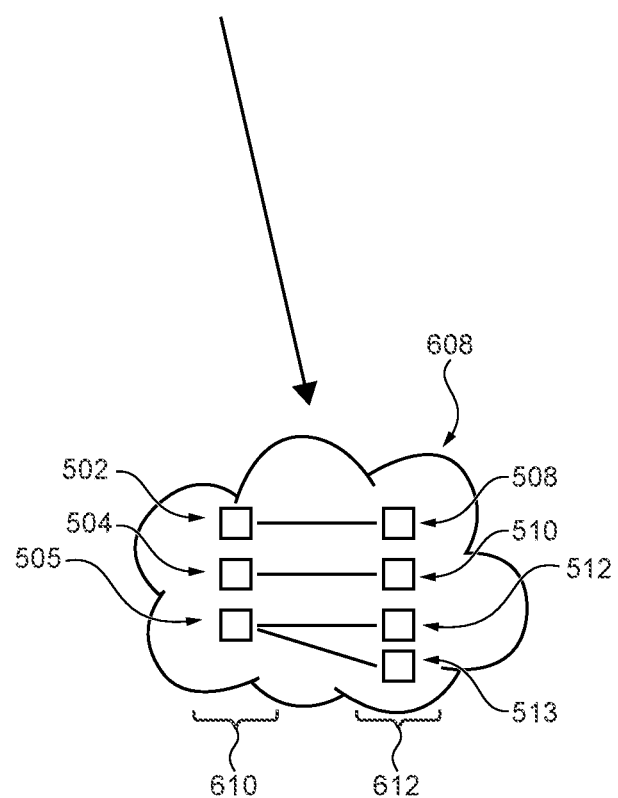
FIG. 6 depicts a quotation cluster generated by a first classifying routine executed as part of the process of FIG. 4.

With brief reference to FIG. 6, there is provided a non limiting example of a list 600 illustrating the quotation similarity values of the first quotation 502 with respect to each of the second quotation 504, the third quotation 505 and the fourth quotation 506.

In the illustrated example, the first classifier 418 has assigned a first quotation similarity value 602 (i.e. the first binary value) indicative that the first quotation 502 and the second quotation 504 are likely originating from the same original quotation.

The first classifier 418 has also assigned a second similarity value 604 (i.e. the first binary value) indicative that the first quotation 502 and the third quotation 505 are likely originating from the same original quotation.

Finally, the first classifier 418 has assigned a third quotation similarity value 606 (i.e. the second binary value) indicative that the first quotation 502 and the fourth quotation 506 are not likely originating from the same original quotation.

Based on the list 600, the first classifier 418 is further configured to generate a quotation cluster 608, which comprises a set of similar quotations 610. The set of similar quotations 610 comprises the quotations having been assigned a quotation similarity value above a second threshold. In some implementations, the quotations that have been assigned the first binary value are above the second threshold.

As such, the quotation cluster 608 comprises quotations that have been previously determined to be likely originating from the same original quotation (i.e. have been previously assigned the first binary value). In the provided illustration, the set of similar quotations 610 comprises the first quotation 502, the second quotation 504 and the third quotation 505.

The quotation cluster 608 further comprises a set of candidate authors 612. The set of candidate authors 612 includes the one or more candidate authors for each of the first quotation 502 (i.e. the first candidate author 508), the second quotation 504 (i.e. the second candidate author 510), and the third quotation 505 (i.e. the third candidate author 512 and the fourth candidate author 513).

Second Classifying Routine

Returning now to FIG. 4, the first classifying routine 404 is configured to transmit a data packet 420 to the second classifying routine 406. The data packet 420 comprises the quotation cluster 608.

The second classifying routine 406 is configured to execute a second classifier 422. The second classifier 422 is configured to analyze the set of candidate authors 612 and determine if a given candidate author meets a condition. The given candidate author that meets the condition is considered to be the correct author for each of the quotations included within the quotation cluster 608 (the first quotation 502, the second quotation 504, and the third quotation 505).

In some implementations, the given candidate author that meets the condition is the candidate author that have a highest frequency of occurrence within the set of candidate authors 612. As such, determining whether a given candidate author meets the condition comprises (i) determining the frequency of occurrence of each of the candidate authors included within the set of candidate authors 612 (the first candidate author 508, the second candidate author 510, the third candidate author 512 and the fourth candidate author); and (ii) if a given candidate author has the highest frequency of occurrence, the second classifier 422 determines that the given candidate is the correct author for each of the quotations included within the quotation cluster 608 (the first quotation 502, the second quotation 504, and the third quotation 505).

For example, the second classifier 422 is configured to determine the frequency of occurrence of the second candidate author 510 ("Trudeau") within the quotation cluster 608 to be the highest, since each of the first candidate author 508 and the third candidate author 512 comprises at least the word "Trudeau". Accordingly, the second classifier 422 is configured to associate the second candidate author 510 as the correct author for the first quotation 502, the second quotation 504, and the third quotation 505.

The second classifier 422 is further configured to store the second candidate author 510 as the correct author (or speaker) for each of the quotations included within the quotation cluster 608 (i.e. the first quotation 502, the second quotation 504 and the third quotation 505).

In some implementations, the second classifier 422 has access to an image database (not shown), in order to retrieve and store one or more images related to the correct author.

In some implementations, the second classifier 422 has access to a name database (not shown) which stores a plurality of names and their respective titles. For example, the name database (not shown) may store an indication that the name "Trudeau" is associated with the title "Prime Minister of Canada". As such, the second classifier 422 may be configured to access the name database (not shown) to retrieve and store the associated title related to the second candidate author 510, and store the second candidate author 510 and the associated title as the correct author (i.e. "Prime Minister of Canada Trudeau").

Quotation Selection Routine

Having established the correct authorship to each of the quotations included within the quotation cluster 608, the second classifying routine 406 is configured to transmit a data packet 424 to the quotation selection routine 408. The data packet 424 comprises the set of similar quotations 610, as well as the correct author associated with the set of similar quotations 610.

The quotation selection routine 408 is configured to determine a best quotation from the set of similar quotations 610. The best quotation corresponds to the most representative quotation for the news reported by the first digital document 204, the second digital document 206 and the third digital document 208.

The manner in which the quotation selection routine 408 selects the best quotation is not limited. For example, the quotation selection routine 408 may identify the quotation having a longest length as the best quotation. In some implementations, the quotation selection routine 408 may be configured to select the quotation having a largest length that is below a third threshold. The manner in which the third threshold is determined is not limited, and may for example be determined empirically.

For example, the quotation selection routine 408 may determine that the third quotation 505 is the longest quotation within the set of similar quotations 610, but that the length of the third quotation 505 is above the third threshold. As a result the quotation selection routine 408 discards the third quotation 505 as the best quotation, and selects the second quotation 504 (provided that the second quotation 504 is below the third threshold) as the best quotation.

Having determined the best quotation and its correct author, the process now turns to another aspect of the news aggregator application 122, which is directed at identifying the best article (described below).

Article Selection Routine

The quotation selection routine 408 is configured to transmit a data packet 426 to the article selection routine 410. The data packet 426 comprises the first topic cluster 202 (which was previously received by the quotation parsing routine 402).

The article selection routine 410 is configured to select a best article from the first topic cluster 202 (which comprises the first digital document 204, the second digital document 206 and the third digital document 208). The best article corresponds to the digital document that is selected for display on a main page of the news aggregator application 122 when accessed by the electronic device 102 (discussed below).

The manner in which the article selection routine 410 selects the best article is known in the art and therefore will not be described in detail herein. Just as an example, the article selection routine 410 may be configured to select the best article by ranking the first digital document 204, the second digital document 206 and the third digital document 208 to determine the "most representative" digital document within the first topic cluster 202.

For example, it may be determined that the first digital document 204 is the best article within the first topic cluster 202.

Although the first digital document 204 has been determined as the best article, the best quotation has been determined to be the second quotation 504 which originates from the second digital document 206 (and not the first digital document 204).

This is based on the assumption by the developers that even if a particular news article (such as the first digital document 204) is determined as being the best article, it does not necessarily mean that the given news article includes the best quotation to represent the reported news.

A special technical effect of the present technology is thus to identify not only the best article from the first topic cluster 202, but also identify the best quote (and its associated author) that is found within one of the digital documents of the first topic cluster 202 which may not be originating from the best article itself.

Having described the manner in which the best quotation, its corresponding author, and the best article have been determined, attention will now be turned to the manner in which the best quotation, its corresponding author, and the best article is used by the news aggregator application 122.

Accessing the News Aggregator Service

Attention is now turned back to FIG. 1. As stated previously, the news aggregator service executed by the news aggregator application 122 is accessible by the browser application 108. In order to access the news aggregator service, the browser application 108 transmits a data packet 128 (described below) to the server 116.

The data packet 128 comprises a HTTP request to access a main page (described below) of the news aggregator service. Upon receiving the data packet 128, the server 116 is configured to transmit the requested content via a data packet 130 to the browser application 108 (described below).

News Aggregator Application

Figure 7:
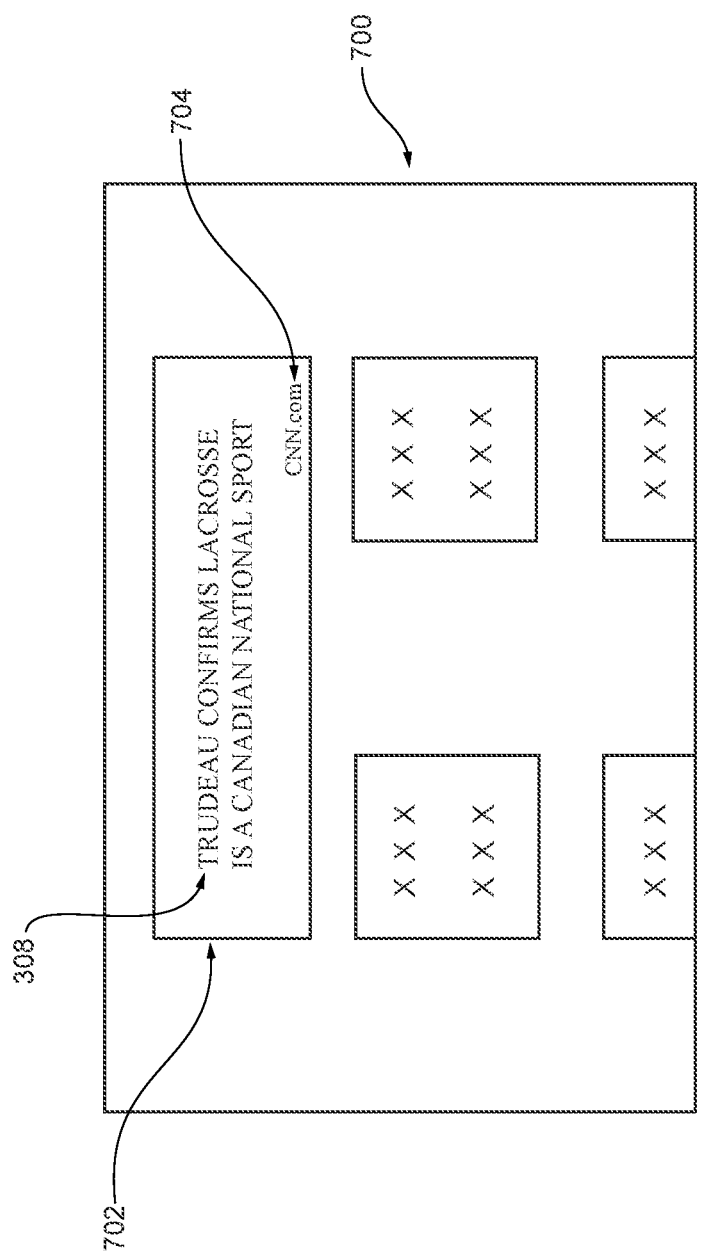
FIG. 7 depicts a screen shot of a main page of a news aggregator service rendered on the electronic device of the system of FIG. 1.

FIG. 7 illustrates a screenshot 700 of a main page of the news aggregator service rendered on the electronic device 102 in response to receiving the data packet 130. FIG. 7 illustrates the main page with five news headlines, which includes, amongst others, a first headline 702.

Recalling that the first digital document 204 has been determined (by the article selection routine 410) to be the best article, a title of the first headline 702 corresponds to the title 308 of the first digital document 204. In some implementations, the first headline 702 further comprises an indication of a first URL 704 of the first digital document 204.

Figure 8:
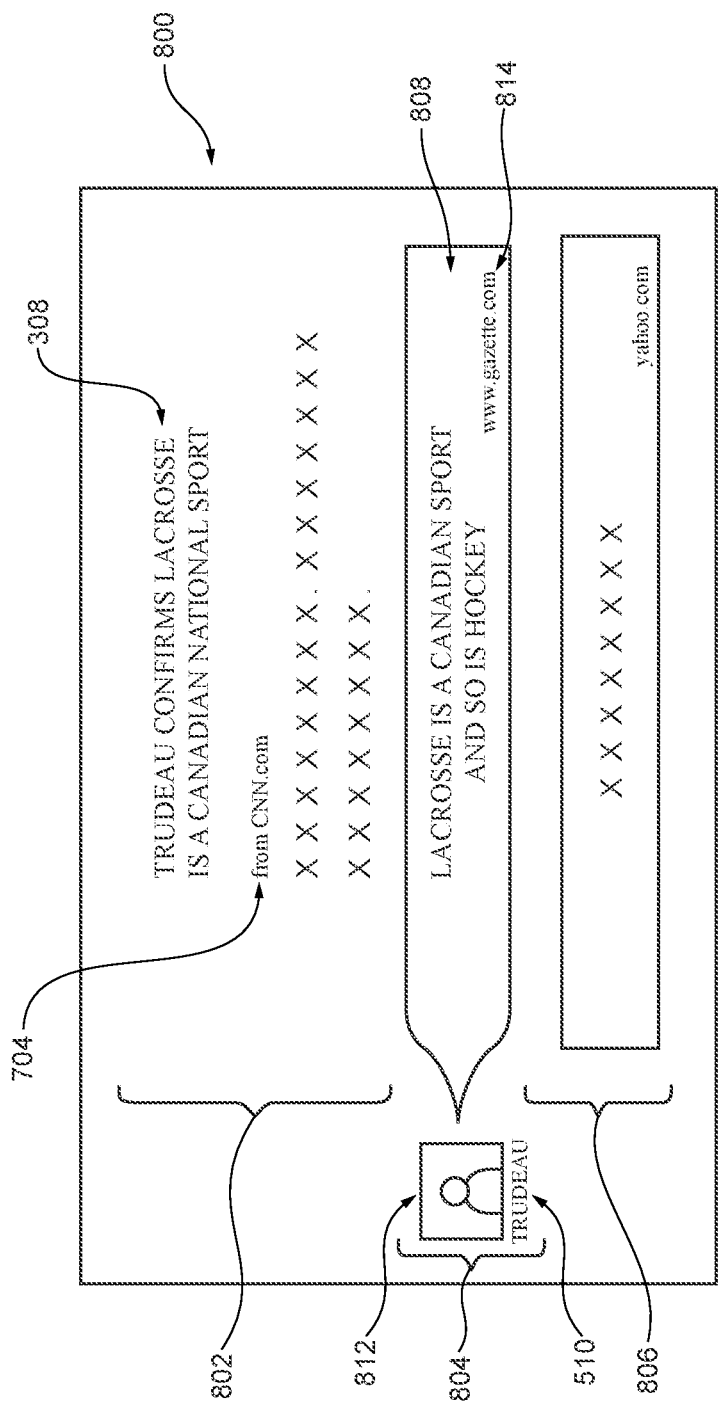
FIG. 8 depicts a screen shot of an anchor page of a news aggregator service rendered on the electronic device of the system of FIG. 1.

In response to a user clicking on the first headline 702, the user is directed to a screenshot 800 (as shown in FIG. 8), which illustrates an "anchor page" related to the first headline 702. It would be understood that the content of the screenshot 800 may be received by the electronic device 102 via the data packet 130 or a separate data packet (not illustrated).

According to non-limiting embodiments of the present technology, the anchor page is divided into three portions, namely a first portion 802, a second portion 804 and a third portion 806.

The first portion 802 comprises the title 308 of the first digital document 204 (i.e. the best article), an extract of the digital text 302 and further comprises the first URL 704, which when clicked by the user, allows the browser application 108 to access the news source of the first digital document 204. As such, in response to the user clicking on the first URL 704, the screenshot 300 (as shown in FIG. 3) would be rendered by the electronic device 102.

The second portion 804 comprises a best quotation 808, which corresponds to the best quotation selected previously by the quotation selection routine 408. Recalling that the quotation selection routine 408 has selected the second quotation 504 as the best quotation, the best quotation 808 corresponds to the second quotation 504.

Additionally, the second portion 804 comprises an indication of the author of the quotation, which corresponds to the second candidate author 510 as previously determined by the second classifying routine 406. In some implementations, the news aggregator is configured to display a previously stored image 812 associated with the correct author.

The second portion 804 further comprises a second URL 814 associated with the second digital document 206, which when clicked by the user, allows the browser application 108 to access the news source of the second digital document 206.

The third portion 806 comprises a title of the third digital document 208 and a URL associated to the third digital document 208.

It is contemplated that the best quotation 808 be provided on another part of the screenshot 800, such as above the title 308.

The various non-limiting embodiments of the present technology may allow determining the correlation between one or more quotations in digital texts and a correct author, with an overall better quality, thereby requiring less time and manoeuvre from a user thus resulting in consuming les computation energy.

Figure 9:
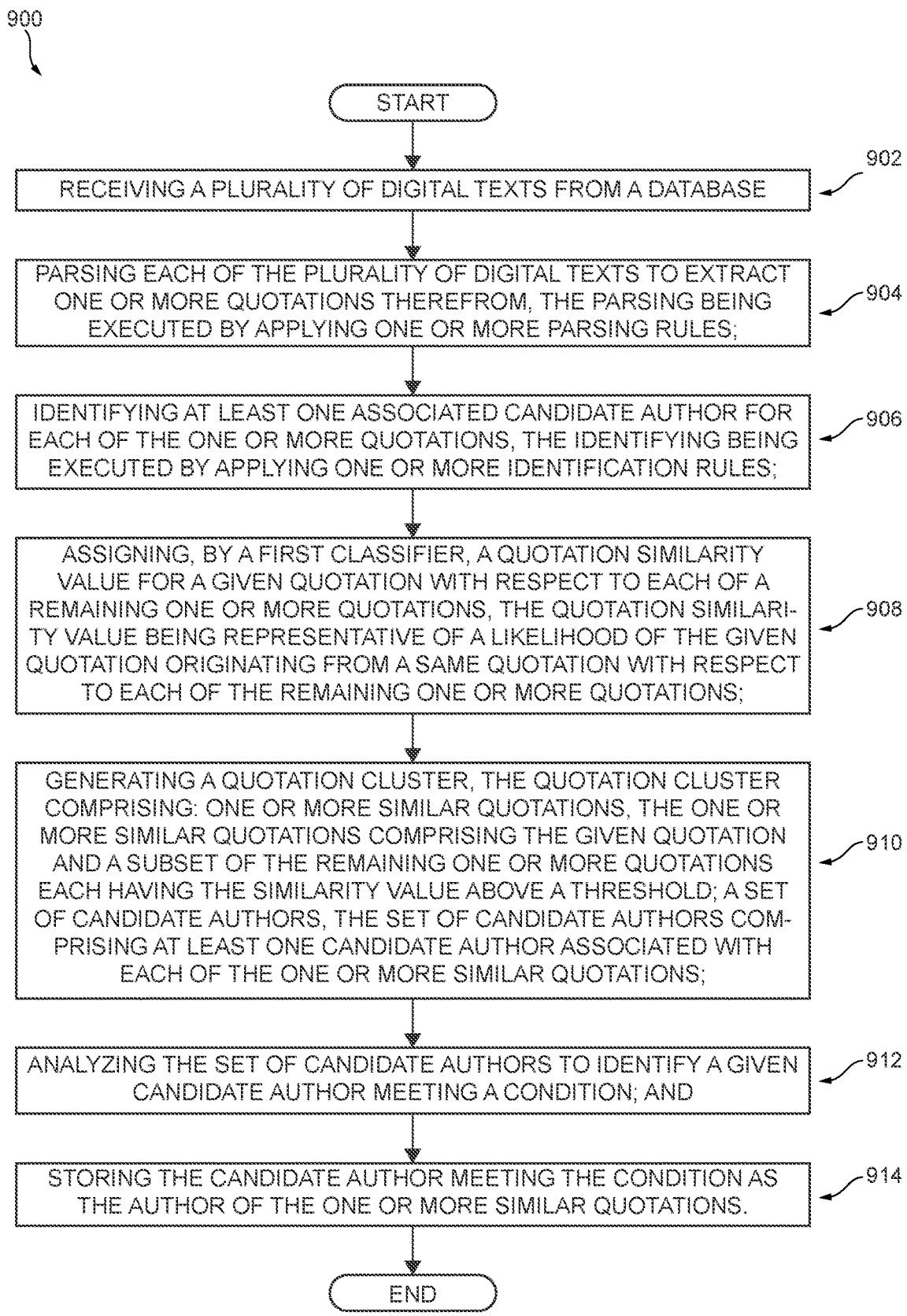
FIG. 9 depicts a block diagram of a flow chart of a method of computer-processing one or more quotations in digital texts to determine an author associated therewith.

Given the architecture and examples provided hereinabove, it is possible to execute a computer-implemented method for associating a correct author to a quotation. With reference to FIG. 9, there is depicted a flow chart of a method 900 for associating an author to a quotation, the method 900 being executable in accordance with non-limiting embodiments of the present technology. The method 900 can be executed by the server 116.

Step 902—Receiving a Plurality of Digital Texts from a Database

The method 900 starts at step 902, where the quotation parsing routine 402 acquires the data packet 414 which comprises the first topic cluster 202 including the first digital document 204, the second digital document 206 and the third digital document 208.

Step 904—Parsing Each of the Plurality of Digital Texts to Extract One or More Quotations Therefrom, the Parsing being Executed by Applying One or More Parsing Rules At step 904, the quotation parsing routine 402 parses the content of each of the first digital document 204, the second digital document 206 and the third digital document 208 to extract one or more quotations. The step of parsing is executed by applying at least one parsing rule, which may be language specific.

Step 906—Identifying at Least One Associated Candidate Author for Each of the One or More Quotations, the Identifying being Executed by Applying One or More Identification Rules At step 906, the quotation parsing routine 402 analyzes the content of each of the first digital document 204, the second digital document 206 and the third digital document 208 to identify at least one candidate author to each of the first quotation 502, the second quotation 504, the third quotation 505 and the fourth quotation 506.

The step of identifying the candidate author is executed by applying at least one identification rule, which may be language specific.

Once the candidate author(s) have been identified, the quotation parsing routine 402 is configured to transmit the data packet 416 to the first classifying routine 404. The data packet 416 comprises the index 500, which includes pairs of the above parsed quotations and their respective at least one associated candidate author.

As such, the first quotation 502 is associated with a single candidate author (the first candidate author 508). The second quotation 504 is also associated with a single candidate author (the second candidate author 510). The third quotation 505 is associated with two candidate authors (the third candidate author 512 and fourth candidate author 513). The fourth quotation 506 is associated with a single candidate author (the fifth candidate author 514).

Step 908—Assigning, by a First Classifier, a Quotation Similarity Value for a Given Quotation with Respect to Each of a Remaining One or More Quotations, the Quotation Similarity Value being Representative of a Likelihood of the Given Quotation Originating from a Same Quotation with Respect to Each of the Remaining One or More Quotations At step 908, the first classifying routine 404 receives the data packet 416. The first classifying routine 404 comprises the first classifier 418 which is configured to assign the quotation similarity value for a given quotation (such as the first quotation 502) in respect to each of the remaining quotations (such as the second quotation 504, the third quotation 505, and the fourth quotation 506).

The quotation similarity value is a value representative of the likelihood that the given quotation (such as the first quotation 502) originates from a same original quotation with respect to each of the remaining quotations (such as the second quotation 504, the third quotation 505, and the fourth quotation 506).

Step 910—Generating a Quotation Cluster, the Quotation Cluster Comprising: One or More Similar Quotations, the One or More Similar Quotations Comprising the Given Quotation and a Subset of the Remaining One or More Quotations Each Having the Similarity Value Above a Threshold; and a Set of Candidate Authors, the Set of Candidate Authors Comprising at Least One Candidate Author Associated with Each of the One or More Similar Quotations At step 910, in addition to assigning the quotation similarity values, the first classifying routine 404 is configured to generate the quotation cluster 608 which comprises a set of similar quotations 610 made up of the first quotation 502 and the one or more remaining quotations (i.e. the second quotation 504, the third quotation 505 and the fourth quotation 506) that have been assigned the quotation similarity value above the second threshold. In some implementations, the quotations that have been assigned the first binary value are above the second threshold.

The quotation cluster 608 further comprises the set of candidate authors 612 which comprises the one or more candidate authors for the respective quotations included within the set of similar quotations 610.

Once the quotation cluster 608 has been generated, the first classifying routine 404 is configured to transmit a data packet 420 to the second classifying routine 406. The data packet 420 comprises the quotation cluster 608.

Step 912—Analyzing the Set of Candidate Authors to Identify a Given Candidate Author Meeting a Condition At step 912, the second classifying routine 406 receives the data packet 420.

The second classifying routine 406 is configured to execute a second classifier 422. The second classifier 422 is configured to analyze the set of candidate authors 612 and determine if a given candidate author meets a condition. The given candidate author that meets the condition is considered to be the correct author for each of the quotations included within the quotation cluster 608 (the first quotation 502, the second quotation 504, and the third quotation 505).

In some implementations, the given candidate author that meets the condition is the candidate author that have a highest frequency of occurrence within the set of candidate authors 612. As such, determining whether a given candidate author meets the condition comprises (i) determining the frequency of occurrence of each of the candidate authors included within the set of candidate authors 612 (the first candidate author 508, the second candidate author 510, the third candidate author 512 and the fourth candidate author); and (ii) if a given candidate author has the highest frequency of occurrence, the second classifier 422 determines that the given candidate is the correct author for each of the quotations included within the quotation cluster 608 (the first quotation 502, the second quotation 504, and the third quotation 505).

Step 914—Storing the Candidate Author Meeting the Condition as the Author of the One or More Similar Quotations At step 914, the second classifying routine 406 is configured to store the candidate author meeting the condition as the correct author for the set of similar quotations 610.

It should be apparent to those skilled in the art that at least some embodiments of the present technology aim to expand a range of technical solutions for addressing a particular technical problem encountered by the conventional news aggregation services, namely correlating one or more quotations to an author.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or non at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer implemented method for processing one or more quotations in digital texts to determine an author associated therewith, the method executable by a server configured to execute a news aggregator service, the server being coupled to a plurality of digital news services via a communication network, the method comprising:
   receiving a plurality of digital texts from a database;
   parsing each of the plurality of digital texts to extract one or more quotations therefrom, the parsing being executed by applying one or more parsing rules;
   identifying at least one associated candidate author for each of the one or more quotations, the identifying being executed by applying one or more identification rules;
   assigning, by a first classifier, a quotation similarity value for a given quotation with respect to each of a remaining one or more quotations, the quotation similarity value being representative of a likelihood of the given quotation originating from a same quotation with respect to each of the remaining one or more quotations;

generating a quotation cluster, the quotation cluster comprising:
> one or more similar quotations, the one or more similar quotations comprising the given quotation and a subset of the remaining one or more quotations each having the similarity value above a threshold;
> a set of candidate authors, the set of candidate authors comprising at least one candidate author associated with each of the one or more similar quotations;
> analyzing the set of candidate authors to identify a given candidate author meeting a condition; and
> storing the candidate author meeting the condition as the author of the one or more similar quotations.

2. The method of claim 1, wherein the digital texts correspond to news articles representative of a same topic, wherein the plurality of news articles are received from the plurality of digital news services.

3. The method of claim 1, wherein the one or more parsing rules comprise extracting one or more portion of digital texts interposed between a given set of quotation marks.

4. The method of claim 3, wherein the one or more identification rules comprise identifying at least one capitalized word within a predetermined distance from the given set of quotation marks.

5. The method of claim 1, wherein:
the given quotation is a first quotation;
the threshold is a first threshold; and
assigning the quotation similarity value to the first quotation in respect to a second quotation comprises:
> determining a shortest common consecutive string of words between the first quotation and the second quotation; and
> determining if a length of the shortest common consecutive string of words is above a second threshold.

6. The method of claim 5, wherein the quotation similarity value comprises a binary value.

7. The method of claim 1, wherein analyzing the set of candidate authors to identify the given candidate author meeting the condition comprises:
> determining a frequency of occurrence of the given candidate author within the set of candidate authors; and
> determining that the frequency of occurrence of the given candidate author is a highest frequency within the set of candidate authors.

8. The method of claim 7, wherein:
the server is further coupled to an image database, the image database comprising a plurality of images associated with at least one of the one or more candidate authors; and
the method further comprises:
> prior to transmitting the data packet, retrieving an image associated with the author; and
wherein the data packet further comprises the image.

9. The method of claim 1, further comprising:
in response to a client device accessing the news aggregator service, transmitting to the client device a data packet, the data packet comprising:
> a best quotation corresponding to one of the one or more similar quotations; and
> the author of the best quotation.

10. The method of claim 9, wherein the best quotation corresponds to one of the one or more similar quotations having a longest string of consecutive words.

11. A server for processing one or more quotations in digital texts to determine an author associated therewith, the server being coupled to a plurality of digital news services via a communication network, the server comprising a processor configured to:
> receive a plurality of digital texts from a database;
> parse each of the plurality of digital texts to extract one or more quotations therefrom, the parsing being executed by applying one or more parsing rules;
> identify at least one associated candidate author for each of the one or more quotations, the identifying being executed by applying one or more identification rules;
> assign, by a first classifier, a quotation similarity value for a given quotation with respect to each of a remaining one or more quotations, the quotation similarity value being representative of a likelihood of the given quotation originating from a same quotation with respect to each of the remaining one or more quotations;
> generate a quotation cluster, the quotation cluster comprising:
>> one or more similar quotations, the one or more similar quotations comprising the given quotation and a subset of the remaining one or more quotations each having the similarity value above a threshold;
>> a set of candidate authors, the set of candidate authors comprising at least one candidate author associated with each of the one or more similar quotations;
> analyze the set of candidate authors to identify a given candidate author meeting a condition; and
> store the candidate author meeting the condition as the author of the one or more similar quotations.

12. The server of claim 11, wherein the digital texts correspond to news articles representative of a same topic, wherein the plurality of news articles are received from the plurality of digital news services.

13. The server of claim 11, wherein the one or more parsing rules comprises extracting one or more portion of digital texts interposed between a given set of quotation marks.

14. The server of claim 13, wherein the one or more identification rules comprise identifying at least one capitalized word within a predetermined distance from the given set of quotation marks.

15. The server of claim 11, wherein:
the given quotation is a first quotation;
the threshold is a first threshold; and
to assign the quotation similarity value to the first quotation in respect to a second quotation, the processor is configured to:
> determine a shortest common consecutive string of words between the first quotation and the second quotation; and
> determine if a length of the shortest common consecutive string of words is above a second threshold.

16. The server of claim 15, wherein the quotation similarity value comprises a binary value.

17. The server of claim 11, wherein to analyze the set of candidate authors to identify the given candidate author meeting the condition, the processor is configured to:
> determine a frequency of occurrence of the given candidate author within the set of candidate authors; and
> determine that the frequency of occurrence of the given candidate author is a highest frequency within the set of candidate authors.

18. The server of claim 17, wherein:
the server is further coupled to an image database, the image database comprising a plurality of images associated with at least one of the one or more candidate authors; and the processor is further configured to:
   prior to transmitting the data packet, retrieve an image associated with the author; and
   wherein the data packet further comprises the image.

19. The server of claim 11, wherein the processor is further configured to:
   in response to a client device accessing the news aggregator service, transmit to the client device a data packet, the data packet comprising:
      a best quotation corresponding to one of the one or more similar quotations; and
      the author of the best quotation.

20. The server of claim 19, wherein the best quotation corresponds to one of the one or more similar quotations having a longest string of consecutive words.

* * * * *